United States Patent [19]

Fulford et al.

[11] Patent Number: 5,051,243

[45] Date of Patent: Sep. 24, 1991

[54] PROCESS FOR INCREASING THE SPECIFIC GRAVITY OF RED MUD SOLIDS

[75] Inventors: George D. Fulford; Anwer M. Khan, both of Kingston, Canada

[73] Assignee: Alcan International Limited, Montreal, Canada

[21] Appl. No.: 447,158

[22] Filed: Dec. 7, 1989

[51] Int. Cl.$^5$ .............................................. B01D 11/00
[52] U.S. Cl. ................................... 423/131; 423/119; 252/8.512; 252/8.516
[58] Field of Search .............................. 423/119, 131; 252/8.512, 8.516

[56] References Cited

U.S. PATENT DOCUMENTS 4,810,682 3/1989 Andrews ............................ 423/119

FOREIGN PATENT DOCUMENTS 1014072 12/1965 United Kingdom ................ 423/131

*Primary Examiner*—Theodore Morris
*Assistant Examiner*—Edward Squillante
*Attorney, Agent, or Firm*—Cooper & Dunham

[57] ABSTRACT

This invention provides an improved process for increasing the specific gravity of red mud. The process comprises mixing red mud in an acidic solution, such as sulfur dioxide solution, having a pH of between about 1.5 and about 3.0 to form an insoluble red mud residue. The specific gravity of the red mud residue can also be increased by heating the residue in air to a temperature of 250° C. to about 300° C. This process enables recovery of a treated red mud derivative having an increased specific gravity in excess of 4.0, which makes the product particularly useful as a weighting agent for drilling fluid, and as the solid phase of slurries used to fill crevices and fissures exposed by drilling or excavation.

14 Claims, No Drawings

PROCESS FOR INCREASING THE SPECIFIC GRAVITY OF RED MUD SOLIDS

BACKGROUND OF THE INVENTION

1. Field of the Invention

This invention relates to a process for increasing the specific gravity of red mud produced as a waste product of the Bayer process for extraction of aluminium from bauxite, and the use of the products of such an improved process as a weighting agent in drilling slurries or fluids or as the solid phase of a slurry used to seal crevices and fissures exposed by drilling and excavation.

2. Description of the Prior Art

Red mud is a leaching residue from the Bayer process for producing alumina from bauxites, and is so named because of the red brown color caused by its iron oxide content. According to a paper by Gerhard Haake entitled "Red Mud—A Waste or a Valuable By-Product?" appearing in *Neue Hutte*, Vol. 33, pp. 424–429 (November 1988), the amount of red mud resulting from aluminum production is estimated to be 30–35 million tons annually. At present, most of the red mud is impounded in mud lakes or lagoons.

This, however, is not an ideal solution to the disposal of red mud. Mud lakes requires a significant amount of land because the solids settle at a very slow rate. Thus, it is not unusual to have a mud lake of several hundred acres associated with each Bayer process plant site, and the mud lake must be carefully maintained to minimize of contamination of nearby water sources. Even when the sites are carefully maintained, increasing pressure from environmental agencies and environmental groups require further efforts to minimize the amount of red mud which must be disposed in lagoons or ponds.

Accordingly, attempts have been made to find uses for red mud, and to recover as much as possible of the useful minerals therefrom. Haake reports that red mud treated with sulfuric or hydrochloric acid produces soluble sulfates of aluminum and iron which are used for flocculating or precipitating agents in the purification of water. A comprehensive review of the technology available for utilization of red mud waste is contained in Parekh and Goldberger, "Utilization of Red Bayer Process Muds: Problems and Possibilities" a paper delivered at the Proceedings of Sixth Mineral Waste Utilization Symposium, U.S. Bureau of Mines and ITT Res. Inst. (1978). That paper discloses among other things that red mud could possibly be used in construction block and as brick materials, as plastic and resin fillers, and as a lightweight aggregate material in the fabrication of lightweight, strong concrete.

Other investigators have focused their attention on recovery of useful compounds from red by various treatment processes. For example, U.S. Pat. No. 3,311,449 treats red mud slurry with gaseous sulfur dioxide to separate dissolved sodium compounds from solids or residue. Subsequent treatment with water permits its recovery of iron oxide and titanium oxide.

U.S. Pat. No. 4,668,485 discloses a similar process. According to the disclosure in that patent, red mud is digested with sulfur dioxide in the presence of water to dissolve soda aluminum and silica. Addition of heat selectively precipitates silica and produces a liquor containing soda and aluminum. Addition of lime to the liquor produces a caustic aluminate solution that may be returned to the Bayer process and permits recovery of calcium sulfite which can be calcined to regenerate lime and sulfur dioxide.

Still another process for separating useful compounds from red mud is described in U.S. Pat. No. 3,574,537 in which sulfur dioxide is passed into a solution of red mud and iron oxides are separated therefrom. Further treatment including heating the liquor in a vacuum evaporator helps recover sulfur dioxide and aluminum compounds.

Efforts to recover useful compounds from red mud have largely ignored the important benefits which can be obtained by treating the red muds to improve their physical characteristics and make the waste itself into useful products.

SUMMARY OF THE INVENTION

The principal object of the present invention therefore is to provide a red mud residue or derivative having a high specific gravity which would enable its use as a weighting agent in drilling fluids and muds used by the oil industry, or as the solid phase of a slurry used to seal and stabilize crevices and fissures exposed by drilling and excavation. This object is achieved by providing a process for increasing the specific gravity of red mud. In one embodiment of the invention, the process comprises mixing red mud in an acidic solution having a pH of between about 1.5 and about 2.5 to form an insoluble residue and leach liquor, and then separating the insoluble red mud residue from the leach liquor. The insoluble residue can be heated in the presence of an oxidizing atmosphere such as air to a temperature of between about 250° C. and 700° C., preferably in the range of about 250° C. and about 350° C.

The aforementioned process enables recovery of a treated red mud derivative having an increased specific gravity in excess of 4.0, which makes that product particularly useful as a weighting agent for drilling fluids, and as the solid phase of slurries used to fill crevices and fissures exposed by drilling or excavation.

Further features and advantages of the invention will be become evident upon reference to the following detailed description.

DETAILED DESCRIPTION OF THE PREFERRED EMBODIMENT

As discussed above, red mud solids are the tailings from the Bayer process used to extract alumina from bauxite. The inert substances in this process along with the insoluble impurities produced during the process are discharged as a slurry of solids suspended in a caustic liquid known as red mud. The composition of the solid phase of the red mud varies depending on the type of bauxite being used and its treatment conditions. As a dry substance, red mud typically contains about 18–25% $Al_2O_3$, 15–20% $SiO_2$, 30–40% $Fe_2O_3$, 8–12% $NaO_2$, and 2–7% $TiO_2$, but some constituents may be present in concentrations outside these ranges. Carbonates and water which are lost on ignition amount to about 8–12%. According to Akashi and Shiao, "Recent Trends in Red Mud Utilization Research," Journal of Japan Institute of Light Metals, Vol. 26, No. 3, pp. 150–163 (1976), the true "specific gravity" of red mud is approximately 2.9 and its particle size is about 10–30 microns. As used herein, the term "specific gravity" refers to the ratio of the density of a substance to the density of a standard (such a water for a solid) when both densities are obtained by weighing in air. Such a low specific gravity prevents the untreated red mud from being of much use in industry. Because of this and other undesirable properties, most emphasis in red mud utilization research has focused on recovering minerals from the red mud, and the waste by-product was disposed of in mud ponds or lagoons.

In one embodiment, the process of the present invention increases the specific gravity of red mud by mixing the red mud with an acidic solution having a pH of between 1.0 and 3.0, but preferably between about 1.5 and 2.5 to form an insoluble residue in a leached-liquor. After mixing, the insoluble red mud residue is separated from the leach liquor. Preferably, the pH of the acidic solution is about 2 and the acidic solution is formed by dissolving sulfur dioxide in water containing the red mud solids or to which red mud solids are added. Of course, it should be understood that the actual time at which the sulfur dioxide is added to the water to form an acidic solution is not critical, and the $SO_2$ in water solution can be added to red mud solids or sulfur dioxide gas can be bubbled into a slurry or suspension of red mud solids and water. Alternatively, other acids such as sulphurous and possibly sulfuric acid or hydrochloric acid can be beneficially used.

In practicing the invention, gaseous sulfur dioxide of high purity may preferably be used. Of course, gaseous sulfur dioxide contained in waste gases discharged by metal refining plants, chemical plants, and coal burning plants may also be used. Use of such waste gases in this process advantageously avoids having to exhaust the $SO_2$ in such gases into the air.

After separating the insoluble red mud residue from the leach liquor, sodium and aluminum compounds dissolved in the leach liquor can be recovered therefrom using processes well known to those skilled in the art.

In another embodiment of the present invention, the specific gravity of red mud can also be increased by heating the red mud in an non-reducing atmosphere to a temperature of between about 250° C.-700° C. Preferably, the red mud should be heated to a temperature ranging between about 250° C. and about 350° C., and the non-reducing atmosphere should be air. Although 300° C. appears economically optimum, notable increases in specific gravity have been observed in red muds heated up to 700° C.

An important aspect of the present invention is that it can be adjusted according to the desired specific gravity of the product and the particular Bauxite starting material used. Thus, the red mud solids can be treated in an acidic solution and then the insoluble residue can be heated to about 250° C. or 300° C. or as high as 700° C. If, on the other hand, the maximum specific gravity is not desired, one may select the particular combination of treatments for the red mud solids that would achieve the required increase in specific gravity at the lowest treatment cost.

An additional leaching step may be performed in practicing the present invention using caustic or caustic aluminate to form an insoluble residue and a leach liquor having aluminum containing compounds dissolved therein. This additional leaching step advantageously provides recovery of additionally useful products from the red mud by-product of the Bayer process, and may be performed either before or after the sulfur dioxide or heat treatment steps. Alternatively, the additional caustic leaching step may be omitted altogether, depending on cost limitations and desired end product.

These treatments seem to work by selectively removing constituents of the red mud which have specific gravities lower than that of the average red mud, and increasing the specific gravity of the residual phases of the red mud by low-temperature thermal transformations of mineral phases into mineral phases of higher specific gravity.

In particular, low specific gravity phases of a red mud such as sodalite desilication product and lime reaction products can be selectively dissolved from the red mud by a dilute acid leach (pH 2) while leaving the heavier iron and titania minerals and small quantities of heavy sands preferentially in the residue, which thereby gains in specific gravity on average. If desired, further removal of lower-than-average specific gravity constituents can be achieved by carrying out a mild boehmite digestion to remove original and/or reverted boehmite (and any reprecipitated gibbsite) from the mud.

In all of these selective leaches, the resulting acidic or alkaline solutions also contain in dissolved form mud constituents which are of potential interest for recovery from solution (soda and alumina from sodalite, alumina from calcium aluminates and boehmite, and other metals).

In the case of red muds containing significant amounts of the iron mineral goethite, still further increases in specific gravity can be achieved by mild heating (to 250°-300° C.) to transform the goethite constituent (s.g. $\approx 4.0$-4.2) to an active form of hematite (s.g. 4.9-5.2).

The process also enables recovery of red mud derivatives having specific gravity in excess of 4.0. This is particularly advantageous since, as disclosed in U.S. Pat. No. 3,867,128, the American Petroleum Institute standard for the specific gravity of barite drilling mud weighting agents is 4.2. Thus the present invention provides a red mud derivative which when made into a slurry should have highly desirable properties as a drilling mud or fluid weighting agent, and enables use of the red mud derivatives made in accordance with the process of the present invention as a weighting for a drilling fluid such as drilling mud. The present invention thereby reduces the amount of red mud which must be discarded in lagoons, mud ponds or other mud dumps by enabling its use as the solid phase of a slurry used in filling crevices and fissures exposed by drilling or excavation. Also, red muds of specific gravity increased by heating to $\approx 300°$-500° C. have very large specific surface areas, and could potentially be useful as adsorbents or absorbents.

As shown in the examples below, these treatments increase the specific gravity of the red mud residue, but the present invention provides another important advantage. The solution, once separated, can be processed to recover soda and alumina bound in the sodalite and lime reaction products and the boehmitic alumina (both original and reverted), as well as most of the rare earth elements contained therein.

The following examples, which are provided to illustrate the invention are given to further facilitate the understanding of the operation of the present process and are not intended to be limiting.

EXAMPLE I

Test with red mud from a low-temperature digest of Jamaican bauxite—Samples of this red mud were washed and dried, then portions were subjected to a leach in $SO_2$-water (pH $\approx 2$). The dilute acid solution was filtered off, and the SO$_2$-leached red mud residue was washed and dried at 110° C. Portions of the dried SO$_2$-leached red mud were subsequently heated in air to 300° C. and 700° C. One portion initially wetted with a small amount of 200 g/L caustic soda solution (as equivalent Na$_2$CO$_3$) (to simulate an unwashed red mud) was also heated to 300° C. Further small portions of the SO$_2$-leached muds heated to 300° C. and 700° C. were subsequently also digested for 3 h at 200° C. g/L caustic soda solution initially at an alumina/caustic ratio of 0 to remove any boehmite present. In all cases, the final solid residues were recovered by filtration, washed carefully, and dried at 110° C.

Values of the specific gravities of the solids were determined using a Micrometrics gas pycnometer. The results are shown in Table 1.

TABLE 1

Specific Gravities of Treated Samples of Mud from Jamaican Bauxite

| Sample | s.g. |
| --- | --- |
| Red Mud | 3.96 |
| Red Mud SO$_2$-leached | 3.699 |
| Red Mud SO$_2$-leached, heated to 300° C. | 4.410 |
| Red Mud SO$_2$-leached, heated to 700° C. | 4.625 |
| Red Mud SO$_2$-leached, wetted with caustic and heated to 300° C. | 4.665 |
| Red Mud SO$_2$-leached, heated to 300° C. and digested | 4.674 |
| Red Mud SO$_2$-leached, heated to 700° C. and digested | 4.755 |

The value for the untreated mud was inexplicably high at 3.96; a value of approximately 3.4–3.6 has typically been obtained in the past for comparable Jamaican red muds (see also Example IV). All the other values, however, fall in the expected pattern. Assuming that the initial value is $\approx$3.4–3.6, the selective removal of the relatively small amount of light sodalite (this is a very low reactive silica bauxite) and the small amount of lime reaction compounds from the lab-digested mud led to an increase of the specific gravity of the residue to approximately 3.7. Heating to 300° C. to transform the goethite into active hematite further increased the specific gravity to approximately 4.4, while heating to 700° C. or heating to 300° C. of a sample initially wetted with caustic, which are expected to produce well-crystallized, true hematite, led to a further small increase to the region of specific gravity $\approx$4.65. Removal of boehmite (specific gravity $\approx$3) by digestion of the mud heated to 300° C. led to a further increase in the specific gravity from $\approx$4.4 to $\approx$4.7, while the corresponding removal of boehmite from material heated to 700° C. increased the specific gravity further from $\approx$4.6 to $\approx$4.75.

EXAMPLE II

The B.E.T. surface areas of selected samples were also determined (Quantasorb N$_2$ adsorption method, outgassed at 200° C. for 1 h), and are shown below in Table 2.

TABLE 2

B.E.T. Surface Areas of Treated Samples of Mud from Jamaican Bauxite

| Sample | B.E.T. Area, m$^2$/g |
| --- | --- |
| Red Mud | 71.5 |
| Red Mud, SO$_2$-leached | 77.2 |
| Red Mud, SO$_2$-leached, heated to 300° C. | 101.0 |
| Red Mud, SO$_2$-leached, heated to 700° C. | 29.3 |
| Red Mud, SO$_2$-leached, heated to 300° C. | 73.4 |

TABLE 2-continued

B.E.T. Surface Areas of Treated Samples of Mud from Jamaican Bauxite

| Sample | B.E.T. Area, m$^2$/g |
| --- | --- |
| and digested | |

The very high B.E.T. surface area obtained for the sample heated to 300° C. appears to be characteristic of the very active intermediate hematite (which shows a diffuse hematite pattern by X-ray diffraction). The sample heated to 300° C. and then given a boehmite digest at 200° C. shows a smaller B.E.T. surface area, comparable to the unheated sample. This may indicate that the active intermediate hematite is reversibly hydrated. The sample heated to 700° C. gives a sharper true hematite pattern by X-ray diffraction, and it appears that much of the B.E.T. area is lost on recrystallization.

X-ray diffraction phase analyses were unable to confirm the removal of sodalite after the SO$_2$ leach (due to the small quantity initially present and the unfortunate coincidence of the main sodalite and hematite peaks), but all the other phase changes described above were confirmed, in particular, the complete disappearance of aluminian-goethite peaks for the heated samples, the sharpening of the hematite peaks on heating to 700° C., and the disappearance of traces of boehmite from the digested samples.

EXAMPLE III

A portion of the SO$_2$-leached red mud from Jamaican bauxite was reslurried in water using a laboratory high-speed blender to produce a slurry which was subsequently determined by filtration and drying to have a solids concentration of 48.3% w/w. The rheology of the slurry was determined at room temperature using a Brookfield viscometer with cylindrical spindle No. 2 in a 5.5 cm diameter cylindrical sample holder at rates of rotation 10–100 r.p.m. The results could be well fitted by a Herschel-Bulkley model, giving the rheological equation:

$$\tau = 48.7 + 267(\dot{s})^{0.107}$$

where $\tau$ is the shear stress (dynes/cm$^2$, and $\dot{s}$ is the shear rate (sec$^{-1}$). Although the slurry is quite non-Newtonian in behavior (pseudoplastic index 0.107 (index = 1.0 for Newton fluid)), the yield stress (48.7 dynes/cm$^2$) is quite low considering the high solids concentration, and the apparent viscosity at any shear rate is not particularly high, again in spite of the high solids concentration. Jamaican red muds (before SO$_2$ leaching) are usually quite thick pastes at $\approx$25% solids, and would normally be a solid at 48% solids concentration; the SO$_2$ leached red mud, on the other hand, led to a quite fluid slurry even at 48% solids.

The results indicate that:
a) if required for weighting purposes in a drilling mud, quite large concentrations of at least this particular SO$_2$-leached red mud could be used without causing the slurry rheology to become undesirably "thick";
b) even though some processing of the red mud (e.g. SO$_2$ leaching, followed by rewashing the residue) might be needed, the residues are likely to behave in a manner completely uncharacteristic of Aljam muds such as to make subsequent washing and handling quite simple. Qualitative observations also show a marked improvement in the filtration characteristics, and very large improvements in the sedimentation behavior of the mud after SO2 leaching have also been quantified.

EXAMPLE IV

Tests with other muds—A few further tests were carried out using the following red muds:
1) from a low-temperature digest of Trombetas bauxite; and
2) from a low-temperature digest of yellow Jamaican bauxite.

In each case, the specific gravity of a portion of the red mud was determined, and a second portion was heated to 300° C. and then its specific gravity was determined, using a Micrometrics gas pycnometer in both cases. The results are summarized in Table 3.

TABLE 3

| Specific Gravities of unheated and Heated Mud Samples | |
| --- | --- |
| Sample | s.g. |
| Red mud from low-temperature digest of Trombetas bauxite | 2.94 |
| Same, after heating to 300° C. | 2.82 |
| Red mud from low-temperature digest of Yellow Jamaican bauxite | 3.57 |
| Same, after heating to 300° C. | 3.78 |

The specific gravity of the red mud from Trombetas bauxite No. 38624 is in the expected range (2.9–3.0). Interestingly, heating this red mud to 300° C. led to a small *decrease* in the specific gravity. This is probably due to the fact that: a) most of the iron minerals present in this mud are already in the form of hematite, so that there is no significant gain in specific gravity due to transforming goethite to hematite by heating to 300° C.; and b) the content of sodalite in the red mud is relatively high (reactive SiO2 content of bauxite ≈4.0%), and sodalite will lose significant weight without volume change by slow loss of skeletal water on prolonged heating in the region of 300° C.

For the low-temperature yellow Jamaican bauxite mud, the initial specific gravity is higher, as expected, and there was an appreciable increase in specific gravity on heating to 300° C. However, since this is a very high goethite mud, the final value after heating appears to be unexpectedly low. This is probably due to the fact that this mud is very high in boehmite (original bauxite boehmite=3.7%, which is not extracted in the low-temperature digest, plus reverted boehmite). Boehmite has a specific gravity less than that of the mud, and appreciable amounts of lime compounds are present due to charging lime to control phosphorus (no acid leach), which may partially begin to dehydrate to lower density compounds in the 300° C. range, partly offsetting the increase in specific gravity due to the goethite dehydration.

The results reported here suggest that: (1) very appreciable increases in the specific gravity of red muds can be achieved by simple treatments; (2) the flow and separation characteristics of the resulting residual red mud slurries may be favorably influenced; (3) it may be necessary to "tailor-make" the treatment for each red mud in order to produce the maximum results, using a knowledge of the red mud phase composition in each case; and (4) potentially several of the simple treatments suggested also open routes to the recovery of useful dissolved byproducts in addition to upgrading the mud residue.

EXAMPLE V

Red mud slurry rheology measurements were carried out using a Brookfield viscometer on two slurries, one representing a simulated decanter underflow slurry at 15.3% w/w solids in sodium aluminate liquor (red mud solids not acid leached) and a slurry of a red mud which had bee acid leached then washed, and was re-slurried in a dilute acid solution at 48.3% w/w solids. In both cases, measurements were carried out at various rates of rotation (10 to 100 rpm) on the viscometer, and the results have been fitted to the Herschel-Bulkley rheological model:

$$\tau = \tau_y = K(\dot{s})^n$$

where
- $\tau$ is the shear stress (dyne/cm$^2$)
- $\tau_y$ is the yield stress (dyne/cm$^2$)
- K is the consistency index (dyne.sec.$^n$/cm$^2$)
- n is the flow behavior index (dimensionless)
- s is the shear rate (sec$^{-1}$)

(In the case of a Newtonian fluid, $\tau_y=0$, n=1, and $K=\mu$, the true viscosity.)

For the non-acid-leached red mud slurry of yellow Jamaican bauxite at 15.3% w/w solids and 58° C., $$\tau = 9.4 + 40.9(\dot{s})^{0.24}$$

and for the acid-leached red mud slurry of Jamaican bauxite at 38.3% w/w solids and 30° C., $$\tau = 49 + 267(\dot{s})^{0.11}$$

Although the yield stress and consistency index are higher in the latter case (acid-leached mud), the solids concentration is less than one-third as great in the case of the non-acid-leached mud, and that typically the yield stress and consistency index would increase very sharply with increasing solids concentration for the latter, which would become practically non-fluid before 25% solids were reached, while at 48% solids the slurry of the acid-leached solids is still a fairly "thin" fluid. Tablels 4 and 5 demonstrate the increase in shear rate and net shear stress obtainable by acid leaching Jamaican red mud:

TABLE 4

Test: MUD FROM YELLOW JAMAICAN BAUXITE VISCOSITY - 15.3% solids not acid leached

| | | | | |
| --- | --- | --- | --- | --- |
| Consistency index K = | | | | 40.877369 |
| Flow behavior index N = | | | | 0.237535 |
| Main regression coefficient = | | | | 0.987164 |
| Average Yield Stress = | | | | 9.351902 |

| 0 | RPM | Meter Reading | Yield Stress | Shear Rate | Net Shear Stress |
| --- | --- | --- | --- | --- | --- |
| 1 | 10 | 50.00 | 6.0 | 10.79 | 75.68 |
| 2 | 10 | 46.00 | 5.5 | 10.79 | 69.66 |
| 3 | 20 | 56.00 | 6.5 | 21.58 | 85.13 |
| 4 | 20 | 54.00 | 6.0 | 21.58 | 82.55 |
| 5 | 50 | 67.00 | 6.0 | 53.96 | 104.91 |
| 6 | 50 | 67.00 | 6.0 | 53.96 | 104.91 |
| 7 | 100 | 75.00 | 2.5 | 107.92 | 124.69 |
| 8 | 100 | 78.00 | 5.0 | 107.92 | 125.55 |

TABLE 5

Test: VISCOSITY ON SO2 LEACHED MUD - 48.32% Solids (w/w) - Acid

TABLE 5-continued

| | | Leached | | | |
|---|---|---|---|---|---|
| Consistency index K = | | | | 266.994316 | |
| Flow behavior index N = | | | | 0.106823 | |
| Main regression coefficient = | | | | 0.898702 | |
| Average Yield Stress = | | | | 48.679525 | |
| | R.P.M. | Meter Reading | Yield Stress | Shear Rate | Net Shear Stress |
| 1 | 10 | 30.20 | 2.7 | 25.32 | 390.86 |
| 2 | 10 | 30.80 | 3.5 | 25.32 | 388.01 |
| 3 | 20 | 31.60 | 4.1 | 50.64 | 390.86 |
| 4 | 20 | 32.50 | 5.5 | 50.64 | 383.75 |
| 5 | 50 | 34.30 | 3.3 | 126.61 | 440.60 |
| 6 | 50 | 34.80 | 2.6 | 126.61 | 457.66 |
| 7 | 100 | 37.10 | 2.5 | 253.22 | 491.77 |
| 8 | 100 | 37.30 | 3.2 | 253.22 | 484.66 |

We claim:

1. A method for increasing the specific gravity of red mud residue comprising:
   mixing a red mud in a solution of sulfur dioxide in water having a pH of between about 1.5 and about 2.5 to form an insoluble red mud residue and a leach liquor;
   separating the insoluble red mud residue from the leach liquor; and heating the insoluble red mud residue in a nonreducing atmosphere at a temperature of between about 250° C. and about 700° C. to form a red mud residue having a specific gravity in excess of about 4.0.

2. A method in accordance with claim 1 wherein the solution of sulfur dioxide in water has a pH of about 2.

3. A process in accordance with claim 2 wherein the acidic solution is formed by dissolving sulfur dioxide in water prior to mixing said red mud solids with said acidic solution.

4. A process in accordance with claim 2 wherein said acidic solution is formed by dissolving sulfur dioxide into the liquid phase of a suspension of red mud solids in water.

5. A process in accordance to claim 3 wherein said oxidizing atmosphere is air and said temperature is between about 250° C.–350° C.

6. A process in accordance with claim 5 additionally comprising leaching the red mud or insoluble residue with a caustic solution or caustic aluminate solution to dissolve aluminum compounds contained therein.

7. A process for increasing the specific gravity of red mud comprising:
   heating the red mud in a non-reducing atmosphere to a temperature of between about 250° C. and about 350° C.

8. A process in accordance with claim 7 wherein the non-reducing atmosphere is air and the temperature is about 250°–300° C.

9. A process in accordance with claim 7, wherein the red mud is wetted with caustic soda solution prior to said heating step.

10. A method in accordance with claim 8 additionally comprising:
    leaching the red mud before or after said heating step with a solution of caustic or caustic aluminate to form an insoluble residue and a leach liquor having aluminum containing compounds dissolved therein.

11. A process in accordance with claim 10 wherein said leaching step is performed before said heating step.

12. A process in accordance with claim 11 wherein said leaching step is performed after said heating step.

13. A method for increasing the specific gravity of red mud residue, comprising:
    mixing a red mud with an acidic solution having a pH of about 2 to form an insoluble red mud residue and a leach liquor;
    separating the insoluble red mud residue from the leach liquor;
    recovering dissolved sodium and aluminum compounds from the leach liquor;
    dissolving aluminum compounds from the red mud or red mud residue, before or after said mixing step, with a solution of caustic or caustic aluminate; and
    heating the insoluble red mud residue in the presence of a non-reducing atmosphere to a temperature of between about 250° C. and about 300° C.

14. A process in accordance with claim 13, wherein said heating step is performed after said separating step.

* * * * *